US008542505B2

(12) United States Patent
Jiang-Hafner

(10) Patent No.: US 8,542,505 B2
(45) Date of Patent: Sep. 24, 2013

(54) PRECISION SWITCHING FOR CARRIER BASED PWM

(71) Applicant: Ying Jiang-Hafner, Ludvika (SE)

(72) Inventor: Ying Jiang-Hafner, Ludvika (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/690,632

(22) Filed: Nov. 30, 2012

(65) Prior Publication Data

US 2013/0088906 A1 Apr. 11, 2013

Related U.S. Application Data

(63) Continuation of application No. PCT/EP2010/057609, filed on Jun. 1, 2010.

(51) Int. Cl.
*H02M 1/12* (2006.01)
*H02M 1/14* (2006.01)
*H02M 7/00* (2006.01)

(52) U.S. Cl.
USPC ............ 363/41; 363/40; 363/71; 363/72; 363/73; 363/74; 363/95; 363/97; 363/98

(58) Field of Classification Search
USPC ............ 363/40, 41, 71, 72, 73, 74, 95, 97, 363/98
See application file for complete search history.

(56) References Cited

U.S. PATENT DOCUMENTS

| 4,646,321 | A |   | 2/1987  | Berlinsky |       |
|-----------|---|---|---------|-----------|-------|
| 5,625,545 | A | * | 4/1997  | Hammond   | 363/71 |
| 5,694,068 | A | * | 12/1997 | Rokugo    | 327/159 |
| 5,986,909 | A |   | 11/1999 | Hammond et al. | |
| 6,747,884 | B2 | * | 6/2004 | Nishizawa et al. | 363/132 |
| 6,847,531 | B2 | * | 1/2005 | Bixel     | 363/71 |
| 7,321,500 | B2 |   | 1/2008 | Asplund et al. | |
| 7,663,268 | B2 | * | 2/2010 | Wen et al. | 307/82 |
| 7,839,023 | B2 | * | 11/2010 | Jacobson et al. | 307/77 |

(Continued)

FOREIGN PATENT DOCUMENTS

DE   10103031 A1   7/2002
EP    1819052 A1   8/2007

(Continued)

OTHER PUBLICATIONS

Glinka; "A New AC/AC Multilevel Converter Family"; Industrial Electronics, IEEE Transactions; Published Jun. 2005; pp. 662-669 (1 page abstract Only).

(Continued)

*Primary Examiner* — Bao Q Vu
(74) *Attorney, Agent, or Firm* — St. Onge Steward Johnston & Reens LLC

(57) ABSTRACT

A voltage source converter station including a multilevel voltage source converter, for conversion of electrical power between AC and DC, and a control system. The voltage source converter includes a plurality of switching cells including switchable semiconductors, and the control system includes at least one main control unit for providing a voltage reference signal and a plurality of cell control units. Each cell control unit uses carrier based pulse width modulation for controlling the switching of a respective cell, where the main control unit is communicatively connected to the cell control units and provides the reference voltage signal to each cell control unit and each cell control unit creates a switching signal to each respective switching cell using the reference voltage signal and a carrier signal to effectuate the conversion.

14 Claims, 3 Drawing Sheets

(56) References Cited

U.S. PATENT DOCUMENTS

| | | | |
|---|---|---|---|
| 7,986,535 B2 * | 7/2011 | Jacobson et al. | 363/17 |
| 8,026,639 B1 * | 9/2011 | Sachdeva et al. | 307/82 |
| 8,031,495 B2 * | 10/2011 | Sachdeva et al. | 363/71 |
| 8,227,939 B2 * | 7/2012 | Jacobson et al. | 307/82 |
| 8,279,640 B2 * | 10/2012 | Abolhassani et al. | 363/37 |
| 2005/0122241 A1 | 6/2005 | Magrath | |
| 2006/0044849 A1 | 3/2006 | Siljestrom et al. | |
| 2006/0256587 A1 | 11/2006 | Asplund et al. | |

FOREIGN PATENT DOCUMENTS

| | | |
|---|---|---|
| JP | 10257776 A | 9/1998 |
| WO | 2007023064 A1 | 3/2007 |
| WO | 2009086927 A1 | 7/2009 |
| WO | 2009087063 A1 | 7/2009 |

OTHER PUBLICATIONS

O'Malley, et al.; "A Programmable Digital Pulse Width Modulator Providing Versatile Pulse Patterns and Supporting Switching Frequencies Beyond 15 MHz": 2004 IEEE; pp. 53-59.

International Search Report and Written Opinion of the International Searching Authority Application No. PCT/EP2010/057609 Completed: Feb. 25, 2011; Mailing Date: Mar. 11, 2011 13 pages.

Gemmell, et al.; "Prospects of Multilevel VSC Technologies for Power Transmission"; Transmission and Distribution Conference and Exposition; 2008; pp. 1-16.

* cited by examiner

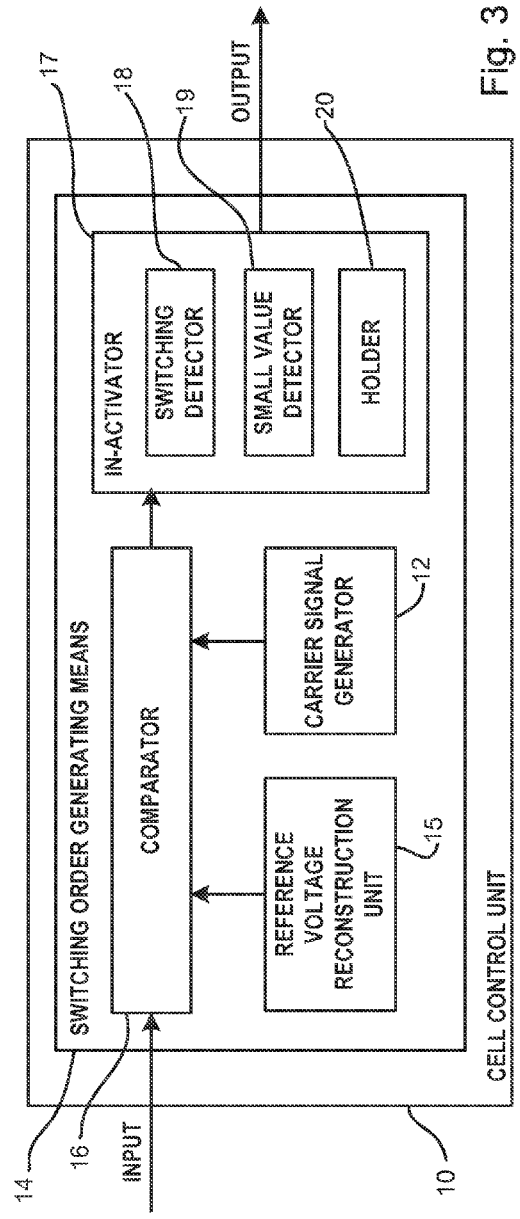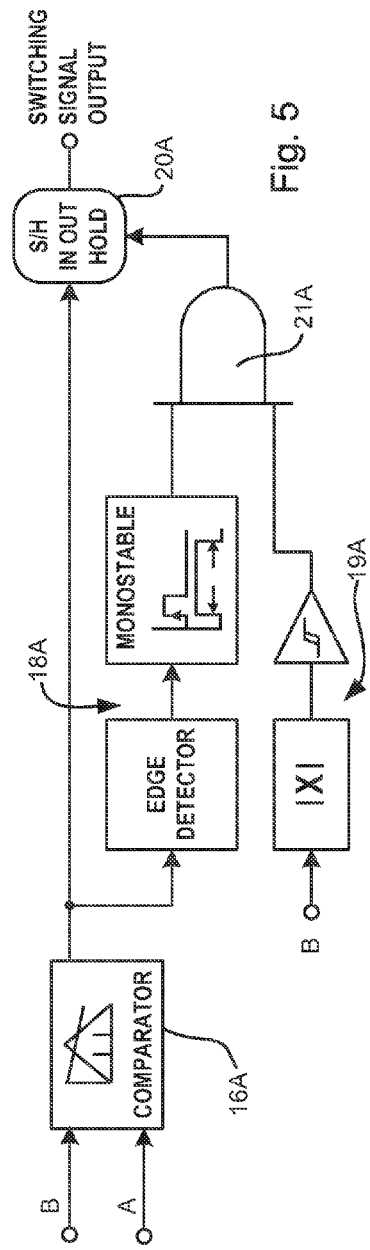

PRECISION SWITCHING FOR CARRIER BASED PWM

FIELD OF THE INVENTION

The invention relates to High Voltage Direct Current (HVDC) systems for electrical power transmission. Especially it concerns controlling a multi-level voltage source converter.

BACKGROUND OF THE INVENTION

HVDC is used for transmissions, and can be used either directly for DC-transmission, or indirectly for regulating AC-transmission systems. Basically, a HVDC system includes a Converter (VSC) for converting AC to DC and vice versa. HVDC converters can be equipped by either thyristors or switchable semiconducting elements, i.e. valves that in contrast to thyristors can be turned off. Examples of turn-off semiconductors are GTO (Gate Turnoff Thyristor), IGBT (Insulated Gate Bipolar Transistor), FET (Field-Effect Transistor), BJT (Bipolar Junction Transistor). HVDC converters with turn-off semiconductors, e.g. HVDC Light converters provided with IGBTs, can also be used for Static VAr Compensation (SVC) and Power Compensation (RPC).

HVDC Light comprises basically two elements: a converter station and a pair of cables.

The converter station includes a control system and Voltage Source Converters. The control system normally controls the VSCs automatically, without communication with other converter stations. A HVDC Light converter station may comprise six switching elements, two switching elements for each phase, comprising high-power transistors in the form of IGBTs (Insulated Gate Bipolar Transistor). The control system, in HVDC Light, is computerised and controls the IGBT-valves by Pulse Width Modulation technique (PWM).

Converter stations having six switching elements in a bridge configuration are called two level converters. An alternative to the two-level converter is the three-level converter having 18 switching elements in a bridge configuration. Also, multi-level converters have been constructed and the present invention primarily concerns the multi-level type.

In HVDC Light, the control system of the Voltage Source CONVERTER station uses Pulse Width Modulation for controlling the IGBT-valves. The modulation is provided by means of generating a tri-signal (a triangular wave), which is compared to a reference signal of the modulation.

In HVDC Light, the control system provides a reference voltage signal (Vref) and a carrier wave, in the form of a triangular carrier signal (tri). The control system compares the two signals and when the reference signal is larger than the carrier signal a switching pulse is generated.

U.S. Pat. No. 7,321,500, B2 (D1) describes a voltage source converter suitable for HVDC Light containing valves, or switching elements, in the form of a plurality of extinguishable (i.e. of turn-off type) semiconducting elements, and a valve control unit including a computer and a pulse width modulator providing an executing control signal for controlling the semiconducting elements (see abstract). The document describes two different modulation methods, the Optimized Pulse Width Modulation (OPWM) and the carrier based Pulse Width Modulation method (carrier based PWM). A drawback with the carrier based PWM is that it requires a higher switching frequency than OPWM. OPWM requires less switching and avoids switching at high current. A drawback with OPWM is that it is vulnerable to transients (column 2, line 9-17 and line 44-65). The voltage source converter of D1 alleviates these problems by using carrier based PWM to handle transients from an AC side and using OPWM otherwise. For this purpose, the VSC includes a "mode detector 14", and the VSC is adapted to change mode during operation, i.e. between the OPWM and the carrier based PWM (see claim 1, column 9-10).

D1 describes a first and a second VSC station (STN1, STN2) in more detail in FIG. 1, which stations are connected to each other. Each station (STN1, STN2) comprises control equipment (CTRL1, CTRL2) for its respective voltage source converter (CON1, CON2). D1 describes an outer active/reactive power control loop (4) that generates the reference values of converter current, which are inputs for an inner control loop (5). The inner current control loop (5) tracks the reference values of the converter current and generates the voltage reference for the converter. The inner control loop (5) outputs an output signal, which is a voltage reference vector for the bridge voltages of the converter (CON1, CON2). The voltage reference vector is supplied to the pulse width modulation unit (7) that generates a train (FPa, FPb, FPc) of turn on/turn off orders (or pulse train) in accordance with a predetermined PWM pattern supplied to the semiconducting valves. This predetermined PWM is suitably a carrier based PWM, such as a sinusoidal PWM (SPWM) (see column 3-4 of D1). Thus, the control system of the prior art uses a voltage reference signal and a carrier signal to create a switching signal, in the form of a pulse train of switching orders, to the VSC, i.e. to each valve of the VSC.

The present invention can be utilized in such a converter station having outer and inner control loops, but a main concern of the invention is the voltage reference and the generation of switching orders, like a pulse train, and therefore further description of the outer and inner control loops are not described in more detail herein.

The problem concerning the high switching frequency of carrier based pulse width modulation can alternatively be addressed by means of a multi-level-converter.

WO2009/086927 (D2) illustrates a multi-level voltage source converter. A Voltage Source Converter of this type is a development of the type known through for example DE 101 03 031 A1 and WO 2007/023064 A1 and it is referred to as a multi-cell converter or M2LC in D2. D2 argues that multi-level Voltage Source Converter of this type is particularly interesting when the number of the "switching elements" or switching cells is comparatively high, such as at least 8 for each phase, and it may well be in the order of 20. A high number of such switching cells connected in series in said phase leg means that it will be possible to control these switching cells to change between said first and second switching state and already at said phase output obtain an alternating voltage being very close to a sinusoidal voltage. This may be obtained already by means of substantially lower switching frequencies than typically used in known Voltage Source Converters for example of the type shown in FIG. 1 in DE 101 03 031 A1 that includes switching elements with at least one semiconductor device of turn-off type and at least one free wheeling diode connected in antiparallel therewith. This makes it possible to obtain substantially lower switching losses. D2 proposes using a Pulse Width Modulation with a saw toothed, or triangular, wave as a carrier wave for switching when the carrier crosses a reference voltage signal. It has turned out that this method of controlling the switching cells according to a Pulse Width Modulation pattern, with distributed individual saw tooth voltages and individual reference alternating voltages adapted to the actual voltage across said energy storing capacitor of the respective switching element, results in a robust and fast control.

A control arrangement (13) is arranged for controlling the switching cells (7) and by that control the converter to convert direct voltage into alternating voltage and conversely.

The control arrangement (13 of D2) provides a method intended for control of Voltage Source Converters with switching cells (7) of the type having at least two semiconductor devices of turn-off type, at least two free wheeling diodes connected in parallel therewith and at least one energy storing capacitor, and two examples of such switching cells are shown in FIG. 2 and FIG. 3. Note that D2 uses the expression "switching element" for switching cells having two semiconductors (IGBTs), whereas other documents refer to one IGBT as one switching element. Therefore, the expression switching cell is primarily used herein for the combination of two semiconductors together with two diodes. The terminals (14, 15 in D2) of the switching cell are adapted to be connected to adjacent switching cells in the series connection of switching cells forming a phase leg. The semiconductor devices (16, 17) are IGBTs connected in parallel with diodes (18, 19). An energy storing capacitor (20) is connected in parallel with the respective series connection of the diodes and the IGBTs. One terminal (14) is connected to the mid point between the two IGBTs (16, 17) as well as the mid point between the two diodes (18, 19). The other terminal (15) is connected to the energy storing capacitor (20), in one embodiment (the embodiment of FIG. 2 of D2), to one side thereof and in another embodiment (the embodiment according to FIG. 3), to the other side thereof. It is pointed out that each semiconductor device and each diode as shown in FIG. 2 and FIG. 3 of D2 may be more than one connected in series for being able to handle the voltages to be provided, and the semi-conductor devices so connected in series may then be controlled simultaneously so as to act as one single semiconductor device. Also, the switching cells of the present invention comprise serially connected semiconductors that are switched simultaneously, acting as one switch.

D2 describes simulations that were done for a phase leg of a converter (according to FIG. 1 of D2) for a pulse number of 3.37 and a frequency of 50 Hz of the AC voltage. The pulse number is number of switching pulses for a switching cell during one period of the AC voltage. The simulations in D2 propose using a non integer as pulse number, and the non integer pulse number provides a balancing effect of the voltages across the capacitors of the different switching cells. In this way a low pulse number can be selected. The system of D2 can use a pulse number of 3.37, and the present invention is also suitable for low pulse numbers, i.e. non integers less than 10, such as less than 5 or even 3.37 as in D2.

WO2009/087063 (D3) is a development of D2, of the same patent family, and describes a control system of a multilevel converter. D3 discuss problems of methods described in M. Glinka and R. Marquardt, "A new ac/ac multilevel converter family," IEEE Transactions on Industrial Electronics, vol. 52, no. 3, June 2005, pp. 662-669. Glinka et. al. propose to control the switching of the power electronic switches in a centralized fashion for all submodules in a certain arm. When the control system determines that a switching event should be performed, the submodule (cell) to be switched is selected.

D3 provides a method and system based on the recognition of the fact that the known control system with a central control unit and arm control units has the disadvantage that each arm control unit needs to control the switching of all its corresponding submodules or cells, which has to be done individually, i.e. each cell requires its own input or reference values to be generated by the arm control unit. Please note that D3 refers to the switching cells as "submodules", whereas D2 uses "switching elements".

The basic principle of the control method in D3 is to perform switching of the switching cells according to a pulse-width modulation (PWM) in a distributed manner rather than in a centralized manner, where one of two PWM related signals, a reference AC voltage or a switching carrier signal, is distributed over time.

The reference AC voltage is a reference value for each voltage source and thereby for each arm. The switching carrier signal is identical in shape for all switching cells of each arm.

The necessary delay in time, for each individual switching cell, is applied to the carrier signal by each subunit, or cell control unit, individually, before comparing the carrier and the reference signals with each other.

A saw tooth signal, or triangular signal, is also preferred as carrier signal in D3.

Regarding the physical implementation of the control system of D3, different possible setups are suggested. The cell control units can for example be hardware integrated with the switching cells, but they can as well be placed in a distance to the corresponding switching cell and connected to it by an optical fibre cable or another suitable communication connection. The cell control units may, for performing the data processing, comprise either a digital signal processor (DSP), a field-programmable gate array (FPGA), an application-specific integrated circuit (ASIC), or a combination thereof. The central control unit may communicate with all the cell control units using electronic circuitry and/or optical fibre cables. In D3, digital signalling should normally be used, with serial and/or parallel communication.

Upon implementing a control system providing a reference voltage signal and a distributed switching control in the cell control units, some design issues arises, especially when controlling switching of a multilevel converter with very low pulse number, like 3.37 pulses described in D2 and D3. The present invention addresses such issues and discloses arrangements and methods to counteract related negative influences.

For these purposes, the present invention provides a voltage source converter station including a voltage source converter and a control system.

SUMMARY OF THE INVENTION

An aim of the invention is to reduce the losses of a voltage source converter, and transmission systems.

For this purpose, the invention provides a voltage source converter having a precise carrier based pulse width modulation switching.

The present invention also provides a voltage source converter capable of having a low switching frequency, and avoids unnecessary, and faulty, switching.

The present invention concerns a multilevel converter with distributed switching control, wherein a voltage reference signal is provided by a main control unit, and the comparison between the reference voltage signal and a carrier signal is performed in each cell control unit. Especially, it discloses using a higher data processing rate in the cell control units than in the main control unit.

Each arm (for each phase) of the converter may have its own main control unit, or alternatively the arms can share the same main control unit.

In a preferred embodiment, each cell control unit includes a carrier signal generator, and generates the carrier signal, preferably also, at a higher rate than the voltage reference signal from the main controller.

In a preferred embodiment each cell control unit includes a reference signal reconstruction unit for adapting the voltage reference signal to the higher data rate of the cell control unit, which signal reconstruction unit is adapted to provide a reconstructed reference voltage signal by interpolating sampling values to the reference voltage signal. Said interpolation is preferably a linear interpolation between consecutive sampling points of the reference voltage signal. Higher degree interpolation is also possible.

In a preferred embodiment each cell control unit includes a comparator for comparing the carrier signal and a reference signal, and the creation of the switching signal includes comparing the carrier signal and the reconstructed reference voltage signal.

In a preferred embodiment each cell control unit includes a switching in-activator for avoiding unnecessary switching by holding the switching signal constant.

Preferably, the switching in-activator includes a small value detector, and the in-activator is arranged to only hold the modulation signal constant when the reference voltage signal is smaller than a threshold value. Especially, the threshold value being 15% of nominal amplitude of the reference voltage signal.

Preferably also, the switching in-activator includes an edge detector arranged for detecting switching pulses in the switching signal, and the switching in-activator is adapted to hold the switching signal constant a short time period after a switching signal is detected and the reference voltage signal is smaller than the threshold. Preferably, the short time period corresponds to the data rate of the main control unit and is the same, or approximately the same as, the time between two sampling values of the reference voltage signal.

The voltage source converter station may be a multilevel converter that preferably has at least eight switching cells per phase of the AC-side, for example at least 20 switching cells per phase of the AC.

Preferably, the carrier based pulse width modulation has a pulse number that is twelve or less, so that the carrier signal for each switching cell has less than twelve pulses for each period of the reference voltage signal. For a 50 Hz AC-side, a pulse number of 4 means a switching frequency of 200 Hz (50*4=200) for the switching cells. Preferably, the pulse number is less than eight, preferably less than four.

Preferably also, the carrier based pulse width modulation of the converter uses a pulse number that is a non-integer.

BRIEF DESCRIPTION OF THE DRAWINGS

FIG. 3 illustrates a control unit of a switching cell in the converter station.

FIG. 5 illustrates a hardware implementation of a comparator and switching generator of a switching cell control unit provided with a switching in-activator.

DETAILED DESCRIPTION OF THE INVENTION

Figure 1:
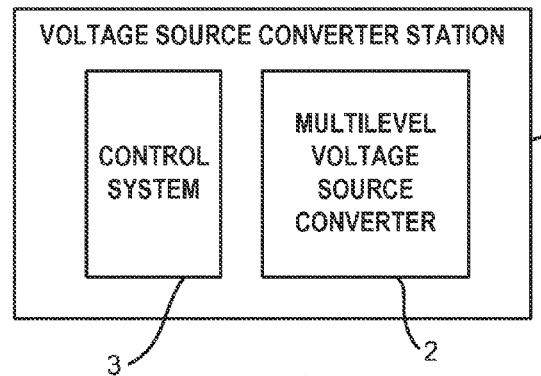
FIG. 1 illustrates a converter station in accordance with the invention.

FIG. 1 illustrates a voltage source converter station 1 comprising a multilevel voltage source converter 2 and a control system 3 arranged and adapted to control the voltage source converter. The control system 3 is suitably adapted to monitor the AC- and DC-sides of the converter station 1, to provide the control of the voltage source converter, e.g. monitoring external and internal voltages and currents for controlling power and reactive power of the AC-side.

Figure 2:
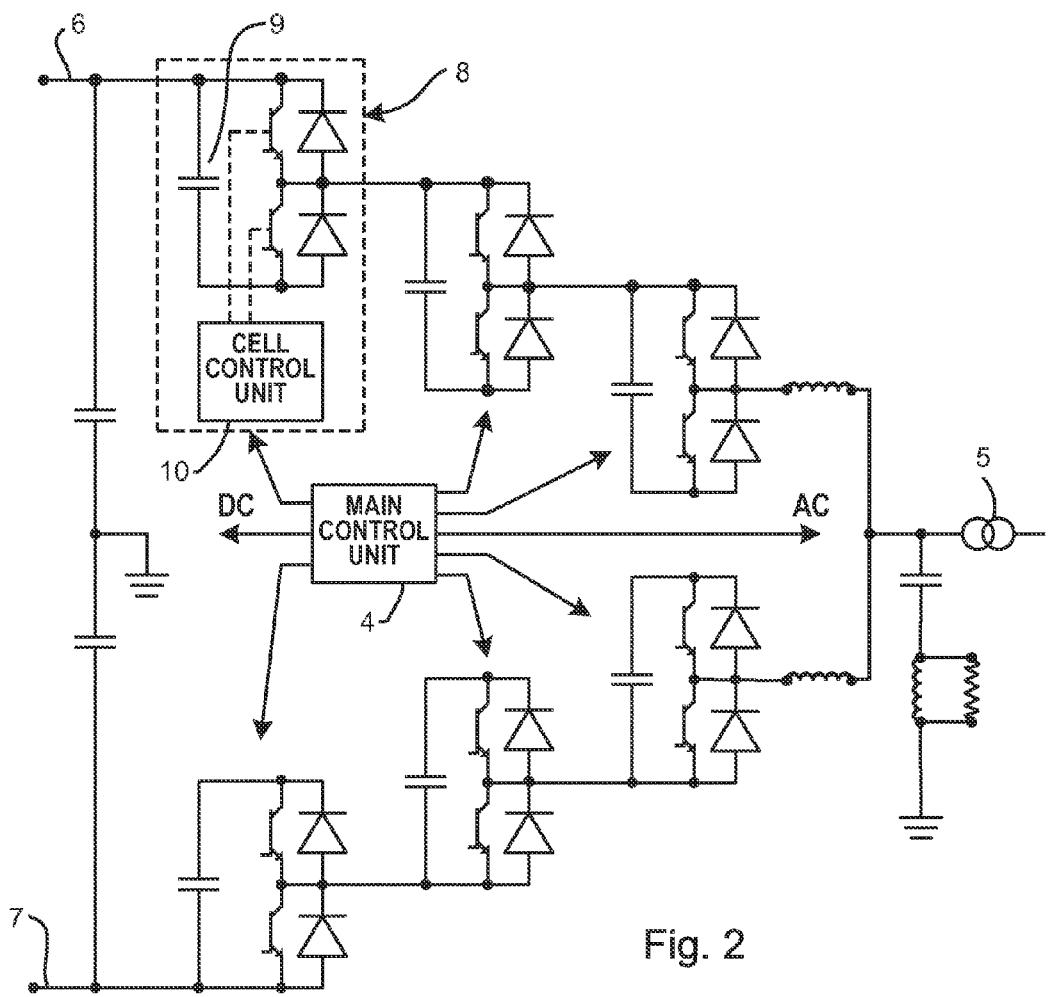
FIG. 2 illustrates a phase leg of the converter station in more detail.

FIG. 2 illustrates an example of one phase leg of the voltage source converter of FIG. 1. The phase leg has an AC side connected to a transformer 5 and a DC side with DC conductors 6, 7. The control system 3 of the converter comprises a main control unit 4 for the phase leg. The phase leg includes a plurality of switching cells 8, each switching cell 8 (for clarity only one of the cells is indicated in detail) has a capacitor 9 for providing voltage and a cell control unit 10 that is operatively connected to, and provided to control the switching of, the semiconductors, IGBTs, of the switching cell. Thus, the control system 3 of the voltage source converter 1 comprises a main control unit 4 for the leg, and a plurality of cell control units 10, each cell control unit 10 being provided to control each switching cell 8, in a distributed manner. Each leg may have one main control unit 4, or alternatively the legs have a common main control unit 4. The main control unit 4 is adapted to generate a reference voltage signal from data acquired by the control system 3. The control system 3 uses carrier based PWM (pulse width modulation) and provides switching pulses to the switching cells using a carrier signal and the reference voltage signal. This control is distributed to the cells, and each cell control unit 10 uses the reference voltage signal of the main control unit 4 and a carrier signal, preferably a triangular wave, to provide switching to effectuate the switching of the cells.

In more detail, the control system 3 comprises means 4 for providing a reference voltage signal, and transfer the reference voltage signal to each of the cells. In the example of FIG. 2, the main control unit 4, of each leg, is operatively connected to each cell control unit 10 (illustrated by arrows) and transfer the voltage reference signal to each cell control unit. The main control unit may suitably include a DSP (Digital Signal Processor) for this purpose and transfer the reference voltage signal by means of a digital data bus. The cell control unit comprises a FPGA (Field-Programmable Gate Array), or alternatively an ASIC (Application Specific Integrated Circuit), for handling the incoming reference signal and provide the outgoing switching orders.

Distributing the switch control from the main control unit 4 to the plurality of cell control units 10 lessens the burden of the main control unit 4 and lessens the communication from main control unit 4 to the cells 8, i.e. to the cell control units 10. For effectuation of accurate switching, the cell control units 10 are suitably equipped with microcomputers working at high data rates. Preferably each cell control unit 10 use a higher data rate than the main control unit 4. Also it is suitable to arrange the cell control units physically close to the switching cell.

FIG. 3 illustrates a switching cell control unit 10 for providing switching signals to the turn off-type semiconductors of the switching cell 8. The cell control unit 10 has an input for receiving a reference voltage signal from the main control unit. Also, the cell control unit 10 comprises means 14 for generating switching orders to each valve. These switching order generating means 14 include a carrier signal generator 12 and a comparator 16. The cell control unit 10 includes an output arranged to provide switching pulses to the switching cell 8.

The carrier signal generator 12 is adapted to provide a carrier signal, in the form of a triangular wave signal, to the comparator 16. The comparator 16 is adapted to compare signals, like the carrier signal and the reference voltage signal, and provide an output signal based on the comparison. Thus, a switching pulse signal can be outputted to each switching cell by its respective cell control unit 10. Providing a pulse train for switching cells using a carrier and a reference signal is known in the prior art.

However the multilevel voltage source converter of the illustrated embodiment also comprises additional means for providing the switching signals to each of the switching cells.

Using higher data rates in the cell control units 10 than in the main control unit 4 may cause the creation of additional switching pulses if the reference voltage signal is compared directly with the carrier signal. This will be explained in more detail with reference to FIG. 4. Therefore, the switching order generating means 14 includes a reference voltage reconstruction unit 15, which is adapted to reconstruct the reference voltage signal. The reference voltage signal is received at a first data rate from the main control unit 4, and the reconstruction unit 15 is adapted to interpolate the signal linearly between the data points and output a reconstructed reference voltage signal at the data rate of the cell control unit 10.

As an example, the main control unit and the data bus use a data rate of 10 kHz, whereas each switching cell control unit can process signals at a data rate of 10 MHz. In this way precise switching can be achieved without being limited by the speed of the data bus or main control unit.

Also, using low pulse numbers may cause the creation of additional switching pulses, since the carrier signal and the reference signal risk running parallel during a part of the wave period. The comparator 16 is arranged to output switching signals when the carrier signal, i.e. the triangular wave signal, crosses the reference voltage signal, similar to a sinus wave. If their frequencies are close, such as if the triangular wave has a low pulse number, the steepest slope of the sinus wave risks being parallel to the triangular wave. The inclination of the reference voltage is, like a sinus wave, typically steepest when the value is small, close to zero. To avoid multiple and unnecessary switching during within this range, the switching order generating means 14 comprises a switching in-activator 17. The in-activator 17 comprises a switching detector 18 for detecting switches and a small value detector 19 for detecting small values of the reference signal. When the reference signal is close to zero, the distance between crossings between the reference signal and the carrier signal is large, i.e. they cross only ones. This is in contrast to crossings appearing close to the top of the signals, where two crossings can appear very close to each other. The fact that there should be a maximum of one crossing for small values is therefore used to limit the number of switching pulses to a maximum of one. This is provided by the in-activator 17 which upon detecting a switching, that is a change of state from the comparator, by means of the switch detector 18 during a period when the value of the reconstructed reference voltage signal is small by means of the small value detector 19, in-activates the generation of further switching pulses for a predetermined time period. The time period for delaying the switches is suitably set to approximately the time period of the data rate of the main control unit 4. The small value detector 19 can suitably be set to detect values smaller than 15% of the amplitude of the reference signal.

Figure 4A:
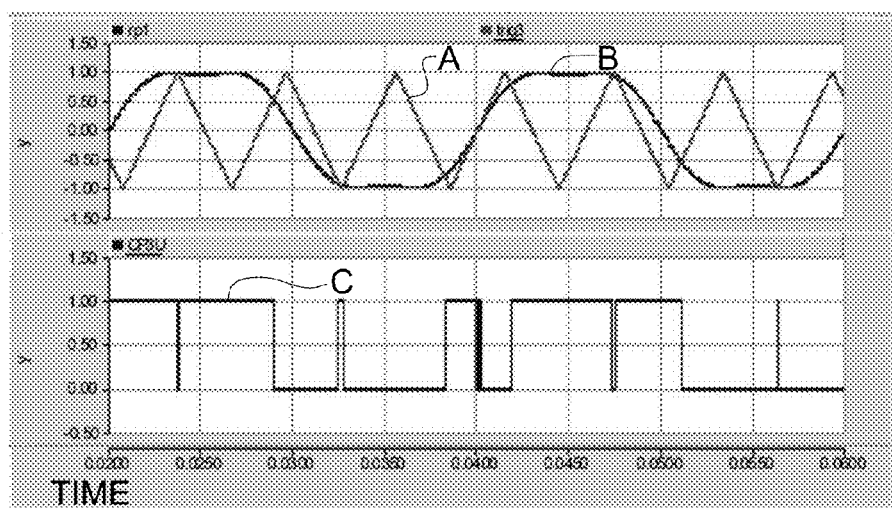
FIGS. 4*a-c* illustrate a simulation of comparing two digital signals and generating a switching pulse signal.
Figure 4B:
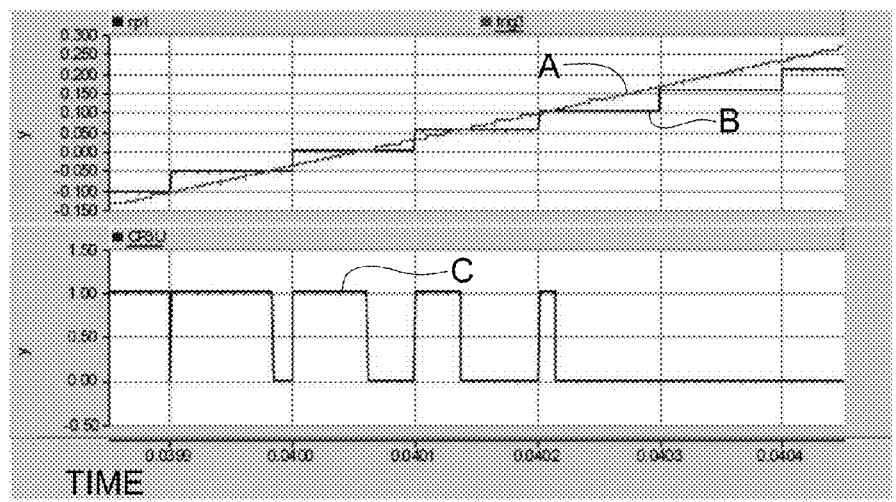

FIG. 4 illustrates simulation of two digital signals at different data rates. The top diagram of FIG. 4A illustrates a triangular carrier A and a reference signal B. The lower diagram illustrates the resulting output C from a comparator, which should provide one change of state at every crossing of the compared signals. However, in FIG. 4a, the outputted signal C has multiple changes where there should be only one, for example at around time 0.0400. This is explained in FIG. 4B, which shows a close up of the diagrams of FIG. 4A around time 0.0400. The top diagram illustrates how the carrier signal provided at a higher data rate crosses the reference signal provided at a lower data rate due to the fact that the slower reference signal appears as a stepwise changing signal compared to the faster carrier signal, and consequently the carrier signal crosses the reference signal at nearly every step when the signals run almost parallel. To counteract the creation of such additional unnecessary switching pulses, every cell control unit reconstructs the reference voltage signal before comparing it to the carrier signal. Thus the received reference signal is reconstructed at the same rate as the carrier signal before the signals are compared, and the reconstructed reference voltage signal and the carrier signal is provided to the comparator, so that the comparator outputs a switching signal from the comparison of the carrier signal and the reconstructed reference signal instead of using the original reference voltage signal.

Figure 4C:
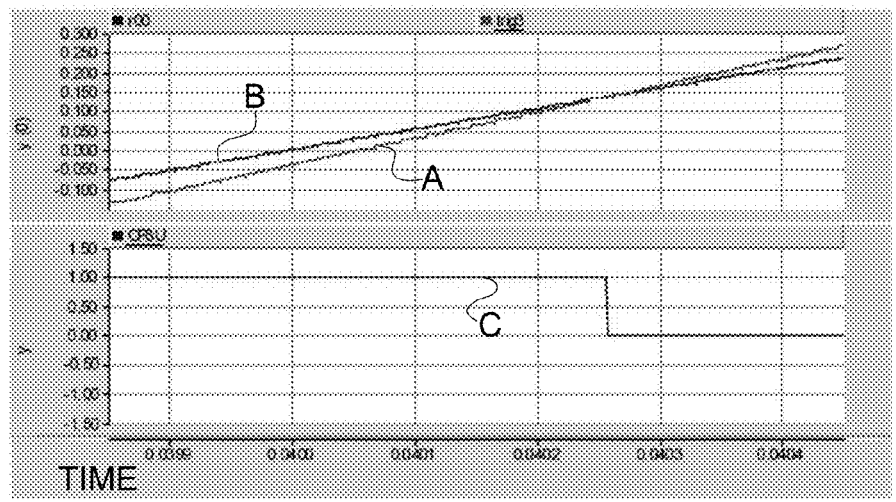

FIG. 4C illustrates the situation when the reconstructed reference voltage signal B is used together with the carrier A, which signal have the same data rate, and the resulting switching signal C having only one change of switching. Thus, unnecessary switching is avoided.

FIG. 5 illustrates a circuit implementation example of means for creating switching pulses from the reconstructed voltage reference signal, or the voltage reference signal, of the switching cell control unit 10 according to the invention. The digital circuit comprises a comparator 16A, having two inputs for the reference voltage signal B, and the carrier signal A. The comparator) 6A also has an output for providing a switching signal. The switching signal is outputted via an inactivating circuit including a holder 20A arranged to hold the signal if inaccurate and unnecessary switching is detected, and otherwise output the signal from the comparator 16A unchanged. The holder 20A is controlled by a control signal from an AND gate 21A, so that the holder 20A inactivates changes of the switching signal from the comparator if it receives a control signal with logic value 1 from the gate 21A. The control signal is outputted from the AND gate if both its input signals have the logical value 1. The input signals of the AND gate 21A are set by respective signals from a switching detector 18A, and a small value detector 19A. Thus, the switching is inactivated if switches are detected and a small value is detected. The reference voltage signal B is input to the small value detector 19A. The switching signal from the comparator is input signal of the switching detector. The switching detector 18A comprises an edge detector and a stabiliser keeping a pulse from the edge detector active for a predetermined time period to avoid switching during this time period, but of course the switching is only inactivated if the small value detector 19A at the same time detects a small value of the reference voltage signal B.

The input signal in FIG. 5 is the reconstructed reference voltage signal, but this inventive cell control unit can also be used for another reference signal having the same rate as the carrier, for example it can be used also in systems where a main control unit provides a reference voltage signal at the same rate as the carrier signal of the system. That is, a system wherein a switching in-activator can be used to avoid faulty switching when the value of the reference signal is low and a switching recently has been effectuated.

What is claimed is:

1. A voltage source converter station including a multilevel voltage source converter, for conversion of electrical power between AC and DC, and a control system, the voltage source converter comprises a plurality of switching cells including switchable semiconductors, and the control system comprises at least one main control unit for providing a voltage reference signal to a plurality of included cell control units, each cell control unit using carrier based pulse width modulation for controlling the switching of a respective cell, wherein the main control unit is communicatively connected to the cell control units and provides the reference voltage signal to each cell control unit and each cell control unit creates a switching signal to each respective switching cell using the reference voltage signal and a carrier signal to effectuate the conversion characterized in that each of the cell control units process signals at a higher frequency than the main control unit, wherein each cell control unit includes a reference signal reconstruction unit, for adapting the voltage reference signal to the higher frequency of the cell control unit, which signal reconstruction unit is adapted to provide a reconstructed reference voltage signal by interpolating sampling values of the reference voltage signal.

2. The voltage source converter station according to claim 1, wherein the interpolation is a linear interpolation between consecutive sampling points of the reference voltage signal.

3. The voltage source converter station according to claim 1, wherein each cell control unit includes a carrier signal generator, and generates the carrier signal.

4. The voltage source converter station according to claim 1, wherein each cell control unit includes a comparator for comparing the carrier signal and a reference signal, and the creation of the switching signal includes comparing the carrier signal and the reconstructed reference voltage signal.

5. The voltage source converter station according to claim 1, wherein each cell control unit includes a switching in-activator for avoiding unnecessary switching by holding the switching signal constant.

6. The voltage source converter station according to claim 5, wherein the switching in-activator includes a small value detector, and the in-activator is arranged to only hold the modulation signal constant when the reference voltage signal is smaller than a threshold value.

7. The voltage source converter station according to claim 6, wherein the threshold value being 15% of a nominal amplitude value of the reference voltage signal.

8. The voltage source converter station according to claim 6, wherein the switching in-activator includes an edge detector arranged for detecting switching pulses in the switching signal, and the switching in-activator is adapted to hold the switching signal constant a short time period after a switching signal is detected and the reference voltage signal is smaller than the threshold.

9. The voltage source converter station according to claim 8, wherein the short time period corresponds to the data rate of the main control unit and is the same, or approximately the same as, the time between two sampling values of the reference voltage signal.

10. The voltage source converter station according to claim 1, having at least eight switching cells per phase of the AC.

11. The voltage source converter station according to claim 10, having at least 20 switching cells per phase of the AC.

12. The voltage source converter station according to claim 1, wherein the carrier based pulse width modulation has a pulse number that is twelve or less.

13. The voltage source converter station according to claim 12, wherein the pulse number is less than 8.

14. The voltage source converter station according to claim 1, wherein the carrier based pulse width modulation has a pulse number that is a non-integer.

\* \* \* \* \*